(12) United States Patent
Natroshvili et al.

(10) Patent No.: US 11,040,714 B2
(45) Date of Patent: Jun. 22, 2021

(54) VEHICLE CONTROLLER AND METHOD FOR CONTROLLING A VEHICLE

(71) Applicant: Intel Corporation, Santa Clara, CA (US)

(72) Inventors: Koba Natroshvili, Waldbronn (DE); Kay-Ulrich Scholl, Malsch (DE)

(73) Assignee: INTEL CORPORATION, Santa Clara, CA (US)

( * ) Notice: Subject to any disclaimer, the term of this patent is extended or adjusted under 35 U.S.C. 154(b) by 171 days.

(21) Appl. No.: 16/245,438

(22) Filed: Jan. 11, 2019

(65) Prior Publication Data

US 2020/0101969 A1 Apr. 2, 2020

Related U.S. Application Data

(63) Continuation-in-part of application No. 16/145,226, filed on Sep. 28, 2018.

(51) Int. Cl.
*B60W 30/09* (2012.01)
*B60W 30/095* (2012.01)
*G05D 1/02* (2020.01)
*G05D 1/00* (2006.01)
*G06N 3/08* (2006.01)
*G06N 5/04* (2006.01)
*G06N 20/00* (2019.01)
*G06K 9/00* (2006.01)

(52) U.S. Cl.
CPC ........ *B60W 30/09* (2013.01); *B60W 30/0956* (2013.01); *G05D 1/0088* (2013.01); *G05D 1/0221* (2013.01); *G05D 1/0223* (2013.01); *G06K 9/00805* (2013.01); *G06N 3/08* (2013.01); *G06N 5/046* (2013.01); *G06N 20/00* (2019.01); *B60W 2554/00* (2020.02); *G05D 2201/0213* (2013.01)

(58) Field of Classification Search
CPC ............. B60W 2554/00; B60W 30/09; B60W 30/0956; G05D 1/0088; G05D 1/0221; G05D 1/0223; G05D 2201/0213; G06K 9/00805; G06K 9/4628; G06K 9/6273; G06N 3/08; G06N 20/00; G06N 5/046
USPC ......................................................... 701/23
See application file for complete search history.

(56) References Cited

U.S. PATENT DOCUMENTS 10,055,653 B2 * 8/2018 Cohen .................... G06T 7/593
10,780,897 B2 * 9/2020 Kim ....................... B60Q 1/503
(Continued)

FOREIGN PATENT DOCUMENTS

CN 111919225 A * 11/2020 ........... G06N 3/0454

*Primary Examiner* — Atul Trivedi
(74) *Attorney, Agent, or Firm* — Viering, Jentschura & Partner MBB

(57) ABSTRACT

According to various examples, a vehicle controller is described comprising a determiner configured to determine information about surroundings of a vehicle, the information about the surroundings comprising information about velocities of objects in the surroundings of the vehicle and a velocity controller configured to input the information about the surroundings of the vehicle and a specification of a path of the vehicle to a convolutional neural network, to determine a target velocity of the vehicle along the path based on an output of the convolutional neural network and to control the vehicle according to the determined target velocity.

18 Claims, 8 Drawing Sheets

(56) References Cited

U.S. PATENT DOCUMENTS

| | | | |
|---|---|---|---|
| 10,895,802 B1* | 1/2021 | Suresh | G01S 13/867 |
| 2017/0008521 A1* | 1/2017 | Braunstein | B60W 40/06 |
| 2017/0200061 A1* | 7/2017 | Julian | G06K 9/00791 |
| 2017/0232963 A1* | 8/2017 | Pal | G07C 5/0866 |
| | | | 280/801.1 |
| 2017/0248953 A1* | 8/2017 | Kelley | B60W 50/08 |
| 2018/0053103 A1* | 2/2018 | Delgado | G06N 7/005 |
| 2018/0053108 A1* | 2/2018 | Olabiyi | B60W 50/0097 |
| 2018/0074493 A1* | 3/2018 | Prokhorov | G05D 1/0274 |
| 2018/0107215 A1* | 4/2018 | Djuric | G06N 3/04 |
| 2018/0120843 A1* | 5/2018 | Berntorp | G05D 1/0221 |
| 2018/0164825 A1* | 6/2018 | Matus | B60W 30/00 |
| 2018/0201273 A1* | 7/2018 | Xiao | G05D 1/0246 |
| 2018/0204111 A1* | 7/2018 | Zadeh | G06K 9/3233 |
| 2018/0375219 A1* | 12/2018 | Kirino | H01P 3/123 |
| 2019/0047559 A1* | 2/2019 | Conde | H04W 4/38 |
| 2019/0205659 A1* | 7/2019 | Cuban | G06K 9/00778 |
| 2019/0212453 A1* | 7/2019 | Natroshvili | G08G 1/166 |
| 2019/0384303 A1* | 12/2019 | Muller | G06K 9/00791 |
| 2019/0384304 A1* | 12/2019 | Towal | G05D 1/0221 |
| 2020/0019165 A1* | 1/2020 | Levandowski | G06N 20/00 |
| 2020/0207358 A1* | 7/2020 | Katz | G06K 9/00845 |
| 2020/0209857 A1* | 7/2020 | Djuric | G05D 1/0221 |
| 2020/0209858 A1* | 7/2020 | Trofymov | G06N 3/08 |
| 2020/0225673 A1* | 7/2020 | Ebrahimi Afrouzi | G05D 1/0214 |
| 2020/0293828 A1* | 9/2020 | Wang | G06K 9/6257 |

* cited by examiner

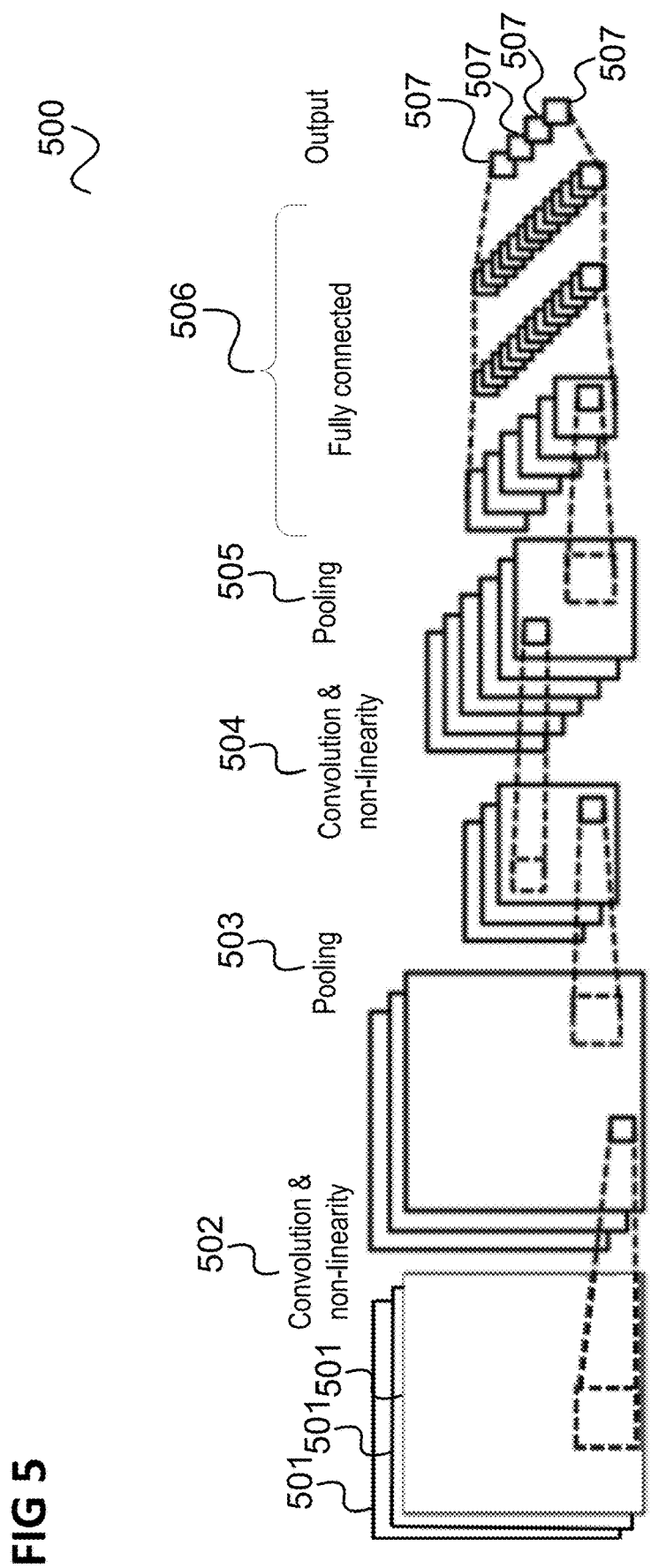

VEHICLE CONTROLLER AND METHOD FOR CONTROLLING A VEHICLE

CROSS-REFERENCE TO RELATED APPLICATIONS

This application is a Continuation in Part Application that claims priority to U.S. Nonprovisional application Ser. No. 16/145,226, filed on Sep. 28, 2018, which is hereby incorporated by reference in its entirety.

TECHNICAL FIELD

Exemplary implementations described herein generally relate to vehicle controllers and methods for controlling a vehicle.

BACKGROUND

Autonomous driving, e.g. the use of self-driving vehicles, has a lot of potential benefits such as reduced mobility and infrastructure costs, increased safety, increased mobility, increased customer satisfaction, and reduced crime. These benefits also include a potentially significant reduction in traffic collisions, resulting injuries and related costs, including less need for insurance. Automated cars are predicted to increase traffic flow, provide enhanced mobility for children, the elderly, disabled, and the poor, relieve travelers from driving and navigation chores, lower fuel consumption, significantly reduce needs for parking space, reduce crime, and facilitate business models for transportation as a service, especially via the sharing economy.

For autonomous driving, a vehicle needs to estimate and evaluate possible future hazards in its surroundings. Furthermore, it is desirable to achieve a driving behavior of the vehicle to minimize risk and maximizing utility. Accordingly, efficient approaches for controlling a vehicle based on information about the vehicle's surroundings are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 5 shows an example of a convolutional neural network.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
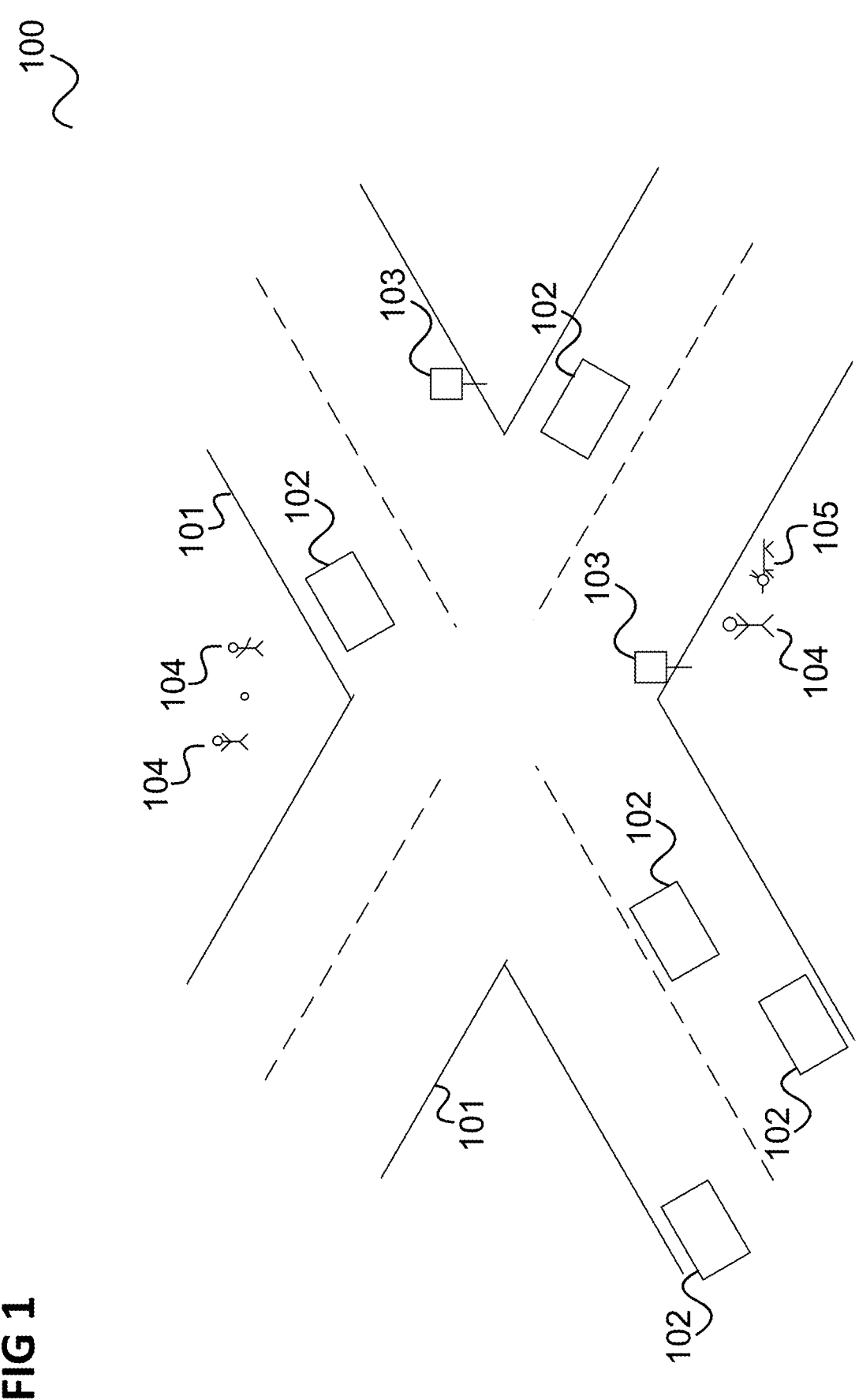
FIG. 1 shows an example of an autonomous driving scenario.

FIG. 1 shows an example of an autonomous driving scenario 100.

In the example of FIG. 1, there is a crossing of two streets 101. Vehicles 102 (e.g. cars, vans or bikes) are driving (or standing when waiting or being parked) on the streets 101. There are also fixed objects 103 like traffic lights, signs, garbage boxes etc. near or on one of the streets 101. Furthermore, there are pedestrians 104 or also animals 105 near or on one of the streets 101.

Figure 2:
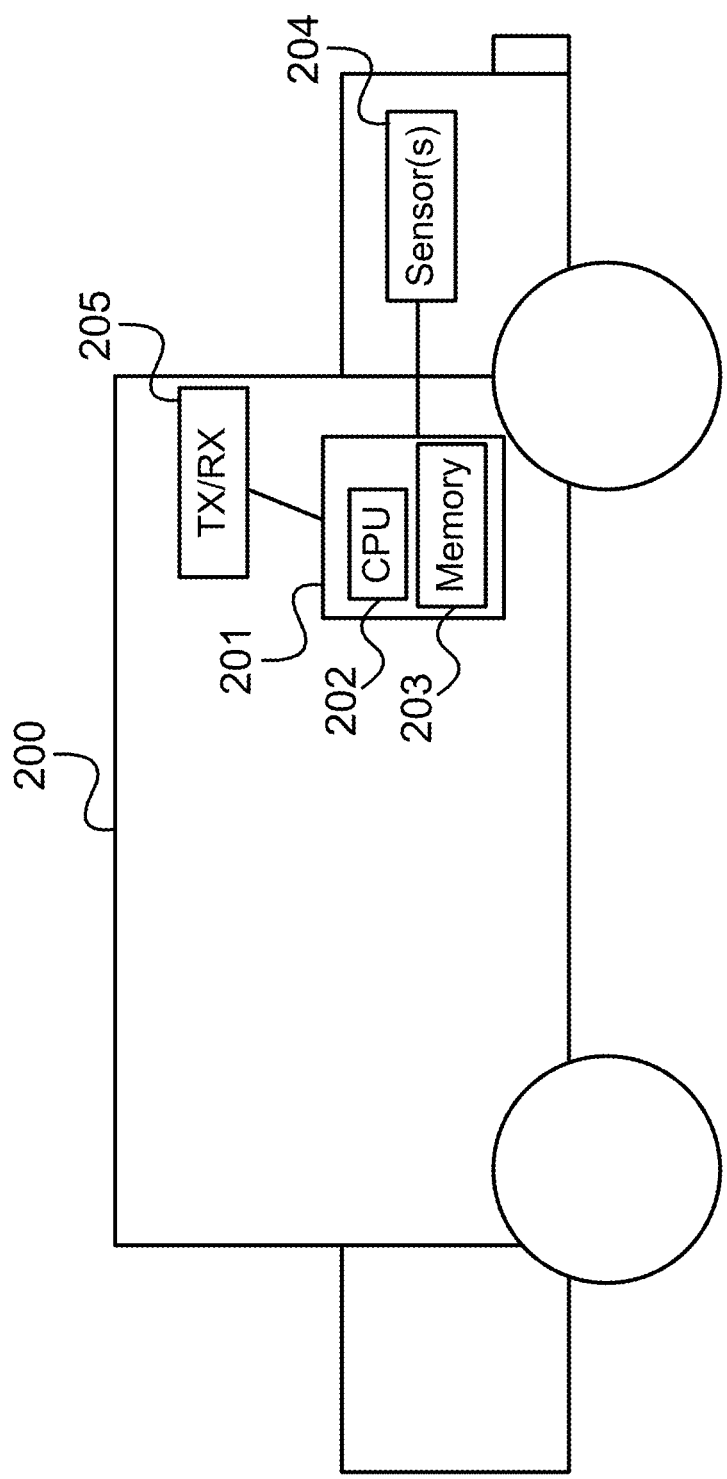
FIG. 2 shows a vehicle, for example corresponding to one of the vehicles of the autonomous driving scenario of FIG. 1.

FIG. 2 shows a vehicle 200, for example corresponding to one of the vehicles 102.

For autonomous driving, the vehicle 200 is provided with a vehicle controller 201. The vehicle controller 201 includes data processing components, e.g. a processor (e.g. a CPU (central processing unit)) 202 and a memory 203 for storing control software according to which the vehicle controller 201 operates and stores data based on which the processor 202 operates. The data stored in the memory 203 may for example include sensor data acquired by one or more sensors 204. The one or more sensors 204 may for example include a camera for taking photos of the vehicle's environment, a radar sensor or a LIDAR (light detecting and ranging) sensor or others.

The data stored in the memory 203 may also include data the vehicle 200 receives from one or more other devices (e.g. another vehicle, a roadside unit or a network server), for example by means of V2X (vehicle-to-everything) communication. For this, the vehicle controller 201 may be coupled to (or include) a communication subsystem 205 of the vehicle 200. The communication subsystem 205 supports radio communication with the one or more other devices, e.g. according to a mobile radio communication standard such as LTE (Long Term Evolution) or 5G (Fifth Generation) via a cellular network or also according to a direct communication (bypassing network side components). It may include corresponding components like a baseband processor, a transceiver one or more antennas etc.

Figure 3:
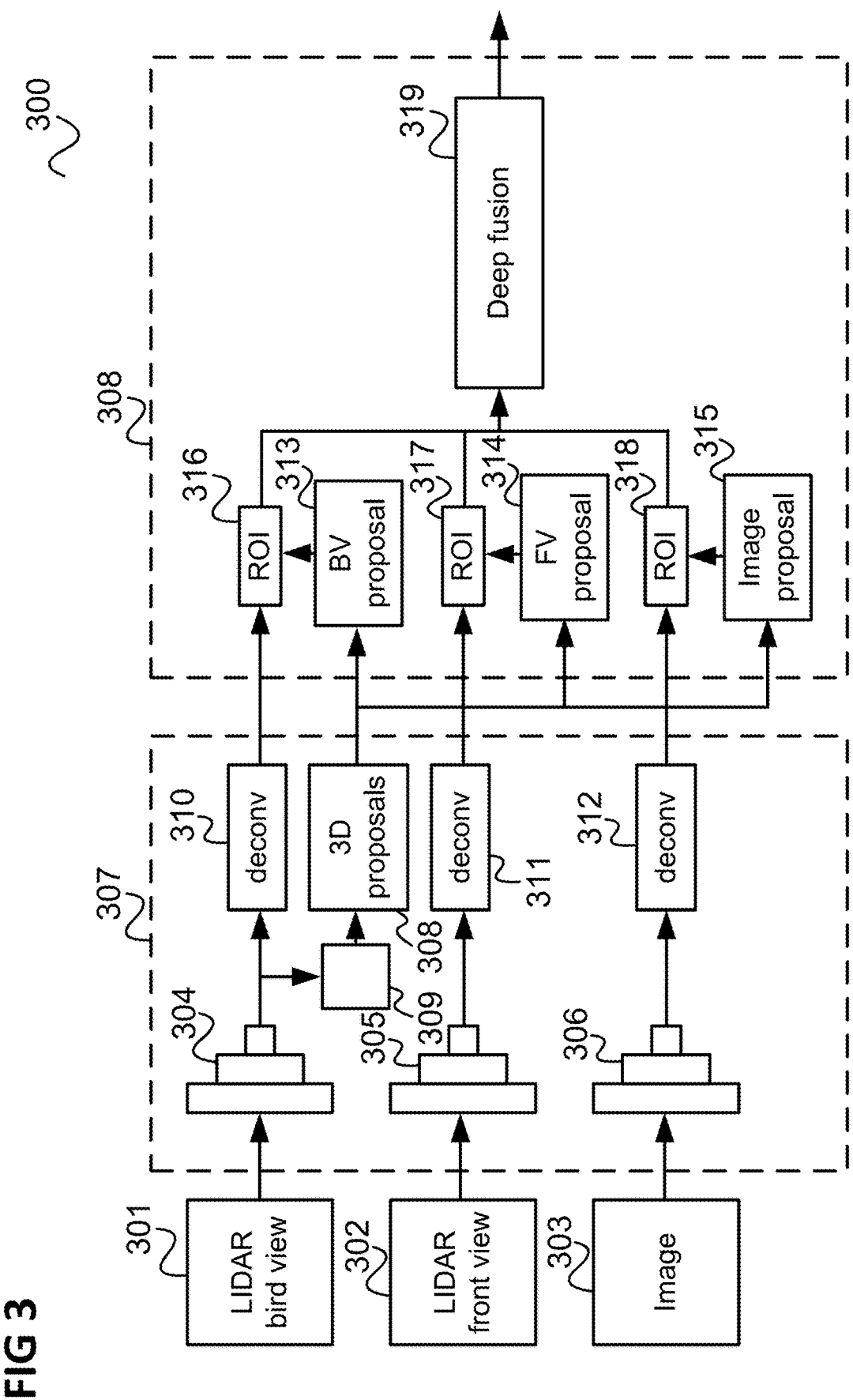
FIG. 3 shows an example of a neural network for modeling an environment of a vehicle.

The vehicle controller may perform environmental modeling, i.e. determine the presence of objects (fixed objects, pedestrians, animals, other vehicles) in the vehicle's surroundings, the velocity of the objects in the vehicle's surroundings, the width and direction of the street and possible intersecting streets etc. based on sensor data such as LIDAR data, radar data or one or more photos (e.g. greyscale or color photos by a camera) using a deep fusion neural network as illustrated in FIG. 3.

FIG. 3 shows an example of a neural network 300 for modeling an environment of a vehicle.

The neural network 300 receives a LIDAR bird view 301 of the vehicle's surroundings, a LIDAR front view 302

(from the point of view of the vehicle) and a front photo image 303 (from the point of view of the vehicle as input. The vehicle controller 201 may for example generate the LIDAR bird view 301 and the LIDAR front view 302 from LIDAR data collected by one of the sensors 204.

The inputs 301, 302, 303 are each processed by respective sets of convolutional layers 304, 305, 306 of a 3D proposal network 307. Based on the output of the convolutional layers 304 processing the LIDAR bird view, the 3D proposal network 307 generates 3D proposals 308, using deconvolution, object classification and 3D box regression 309.

The outputs of the sets of convolutional layers 304, 305, 306 are further processed by respective deconvolution 310, 311, 312 and are supplied, along with the 3D proposals, to a region-based fusion network 308. The 3D proposals 308 give rise to bird view proposals 313, front view proposals 314 and image proposals 315.

The region-based fusion network 308 processes the outputs of the deconvolutions 310, 311, 312, together with the bird view proposals 313, front view proposals 314 and image proposals 315, respectively, by means of respective ROI (region of interest) pooling 316, 317, 318. The region-based fusion network 308 then performs deep fusion 319 of the outputs of the pooling 316, 317, 318. Based on the output of the deep fusion, it generates the model of the environment (e.g. using multiclass classification and 3D box regression).

For a given path of a vehicle, given velocities of a vehicle along the path and a given environment of the vehicle, a certain risk arises. Risk can be defined as 'the probability of something happening multiplied by the resulting cost or benefit if it does'. In the following, examples for risk calculation based on risk functions is described.

It is in the following assumed that the road map based on which risk is calculated is correct. During driving of a vehicle it can be approximated that the vehicle is in the lane center. For the particular road participants some prototypical paths can be generated as hypothesis. This is illustrated in FIGS. 4A and 4B.

Figure 4B:
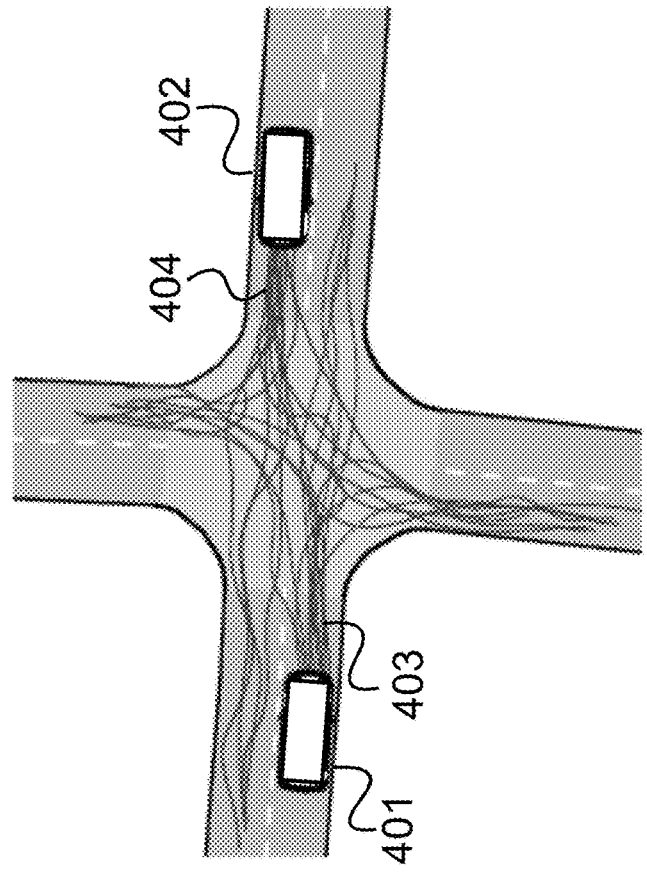
FIG. 4B shows corresponding prototypical paths for the first car and the second car, respectively.
Figure 4A:
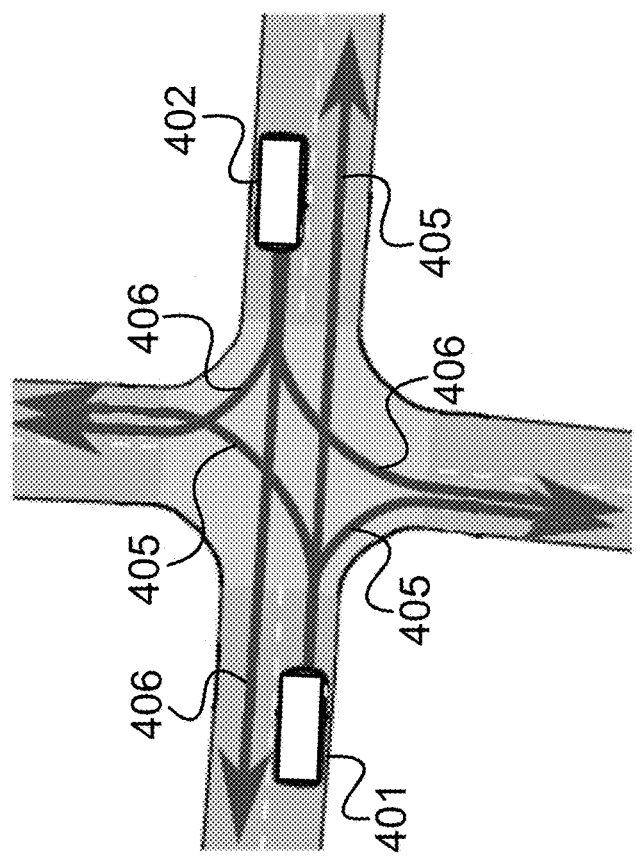
FIG. 4A shows possible paths of a first car and a second car.

FIG. 4A shows possible paths 403, 404 of a first car 401 and a second car 402.

FIG. 4B shows corresponding prototypical paths 405, 406 for the first car 401 and the second car 402, respectively.

FIG. 4A can be seen to include all possible driving scenarios while FIG. 4B only shows prototypical hypothesis.

For automated driving, each vehicle 401, 402 should take care of the maneuvers of the other vehicle because their paths may intersect.

For risk calculation for a vehicle based on a risk function according to various examples, it is assumed that there are n objects in the environment of a vehicle and the ith vehicle has a state $x_t^i$ such that there is a state set:

$$x_t = \{x_t^0, x_t^1, \ldots, x_t^n\} \quad (1)$$

Because the risk is probability that the event happens multiplied with cost damage the future risk in the time t+s can be defined as:

$$r(t+s) = \int c_{t+s} P(c_{t+s}|x_t) dc_{t+s} \quad (2)$$

In the above $P(c_{t+s}|x_t)$ is the probability of damage (cost) $c_{t+s}$ and the integration is done over the set of all costs.

When the vehicle path (or trajectory) is exchanged with a prototypical path (or trajectory) fixed given state vectors can be used and calculation becomes much simpler.

The critical events are usually triggered by simple causes. In the following, it is described how the risk may be calculated for various risk sources.

For the vehicle to vehicle collision risk case an instantaneous event rate depends on the distance of an ego vehicle (i.e. the vehicle for which the risk is calculated) to the traffic participants. This even rate is larger for small distances and decreases. For a situation $h_t$ it can therefore be modeled as $$\tau_d^{-1}(\hat{x}_{t+s}(x_t, h_t), s) = \tau_{d,0}^{-1} e^{-\beta_d(s) \cdot max(\hat{d}_{t+s}(x_t, h_t) - d_{min}, 0)} \quad (3)$$

In the above $\hat{d}_{t+s}(x_t, h)$ is the predicted distance between the ego vehicle and the other traffic participant after a time s and $d_{min}$ is the minimal distance depending on the sizes of the objects limiting the possible physical overlap.

For the risks of drifting off a curve the instantaneous event rate for a situation $h_t$ can be modeled as $$\tau_c^{-1}(\hat{x}_{t+s}(x_t, h_t), s) = \tau_{c,0}^{-1} e^{-\beta_c(s) \cdot max(v_{c\,max} - \hat{v}_{t+s}(x_t, h_t), 0)} \quad (4)$$

In the above $\hat{v}_{t+s}(x_t, h)$ is the predicted vehicle velocity and $v_{c\,max}$ is the maximal allowed velocity in the curve. $v_{c\,max} = \sqrt{a_{c,max} R}$ depends on the maximum centrifugal acceleration of the object and radius of the curve.

For the risk of losing control due to heavy breaking the instantaneous event rate for a situation $h_t$ can be modeled as $$\tau_b^{-1}(\hat{x}_{t+s}(x_t, h_t), s) = \tau_{b,0}^{-1} e^{-\beta_b(s) \cdot max(b_{b\,max} - \hat{b}_{t+s}(x_t, h_t), 0)} \quad (5)$$

Here, $\hat{b}_{t+s}(x_t, h)$ is the predicted acceleration and $b_{b\,max}$ is the maximum acceleration allowed.

In the above equations (3) to (5), the parameters $\tau_{d,0}^{-1}$, $\tau_{c,0}^{-1}$, $\tau_{b,0}^{-1}$, define the respective event rate at minimal distance. $\beta_d(s)$, $\beta_c(s)$ and $\beta_b(s)$ define the steepness of the respective event rates and can be used to model state uncertainties.

For standard events, the cost function as used in equation (2) can be calculated analytically.

For vehicle to vehicle collision the cost function can be estimated as the energy. The energy depends on the masses and velocities of the participants. The cost for a situation $h_t$ and an event $e_{t+s}$ at time t+s can therefore be modelled as $$\hat{c}_{t+s}(e_{t+s}, \hat{x}_{t+s}(x_t, h_t)) = w_c \frac{1}{2} \frac{m_0 m_i}{m_0 + m_i} \|\hat{v}_{t+s}^0(x_t, h_t) - \hat{v}_{t+s}^i(x_t, h_t)\|^2 \quad (6)$$

$m_0$ is the ego vehicle mass
$m_i$ is another vehicle mass
$\hat{v}_{t+s}^0(x_t, h_t)$ is the ego vehicle vector velocity
$\hat{v}_{t+s}^i(x_t, h_t)$ is the other vehicle velocity Equation (6) can be seen to reflect the human natural behavior as well: we try to avoid the collision with bigger and high velocity vehicles more as compared with light ones.

For the risk of drifting of a curve or due to the heavy acceleration (lose control) the cost for a situation $h_t$ and an event $e_{t+s}$ at time t+s can be calculated with a similar equation but assuming velocity of the other participant to be zero and the mass to be infinite:

$$\hat{c}_{t+s}(e_{t+s}, \hat{x}_{t+s}(x_t, h_t)) = w_c \tfrac{1}{2} m_0 \|\hat{v}_{t+s}^0(x_t, h_t)\|^2 \quad (7)$$

With the above equations and approximations it is possible to analytical calculate the driving risk of a vehicle in complex driving scenarios.

For example, the driving risk may be calculated according to (2) wherein the above formulas for the cost are used for calculating the cost in equation (2) and the above formulas for the event rate are used for calculating the probability. For example, assuming an event rate $\tau_{e_{t+s}}^{-1}(\hat{x}_{t+s})$ depending on the predicted future state vector $\hat{x}_{t+s}$ at future time t+s, an instantaneous event probability for small time intervals [t+s, t+s+δt] can be derived as $$P(e_{t+s}|\hat{x}_{t+s}(x_t,h_t)) = \tau_{e_{t+s}}^{-1}(\hat{x}_{t+s})\delta t \qquad (8)$$

Based on the risk, a target velocity profile (assuming a given path) can be generated: it is the velocity profile which minimizes the overall risk during the driving along the path of the vehicle. This may be done by calculating the gradient decent on the risk function with respect to velocity of the vehicle.

According to various embodiments, the vehicle controller uses a convolutional neural network for determining a target velocity or a plurality of target velocities along the (target) path of the vehicle, i.e. a target velocity profile for the vehicle path.

The convolutional neural network may be trained using labeled data (i.e. training data) generated by analytical calculation of the optimal vehicle profile (minimizing risk), e.g. based on the above formulas. The training may be performed before the vehicle controller is deployed in a vehicle or a program code implementing a convolutional neural network trained in this way may be loaded into the memory to be executed by the processor 202.

FIG. 5 shows an example of a convolutional neural network 500.

The convolutional neural network 500 receives its input in the form of a plurality of images 501. The images 501 do not have to correspond to actual images (e.g. photographs) but each image may just be seen as a 2-dimensional array of values (corresponding to pixel values of an image). The values may be real values (such as a greyscale value of an image) but the 2-dimensional array may also include a plurality of values, e.g. a pair or triple of value at each position (i.e. "pixel") of the array (such as RGB components for each pixel of an image).

For the input, the convolutional neural network 500 may include an input node for each pixel value of each image. The images 501 input in this way are then processed by a first convolution and non-linearity 502, formed by a first pooling 503, by a second convolution and non-linearity 504 and a second pooling 505 (and possibly one or more further convolution and non-linearity stages and pooling stages) and lastly by a fully-connected neural network (with one or more layers) 506. The output is given by output nodes 507.

In the example of FIG. 5, the number of nodes is reduced by the pooling and a relatively low number of output nodes are shown. However, the number of output nodes may be higher and may for example be such that the output again corresponds to an image (possibly with lower resolution) as the input images 501.

For the application as described above the output may for example be an output image showing the target velocity profile (i.e. showing a graph specifying a target velocity for each point (according to the x-resolution of the image) along the path of the vehicle).

Figure 6:
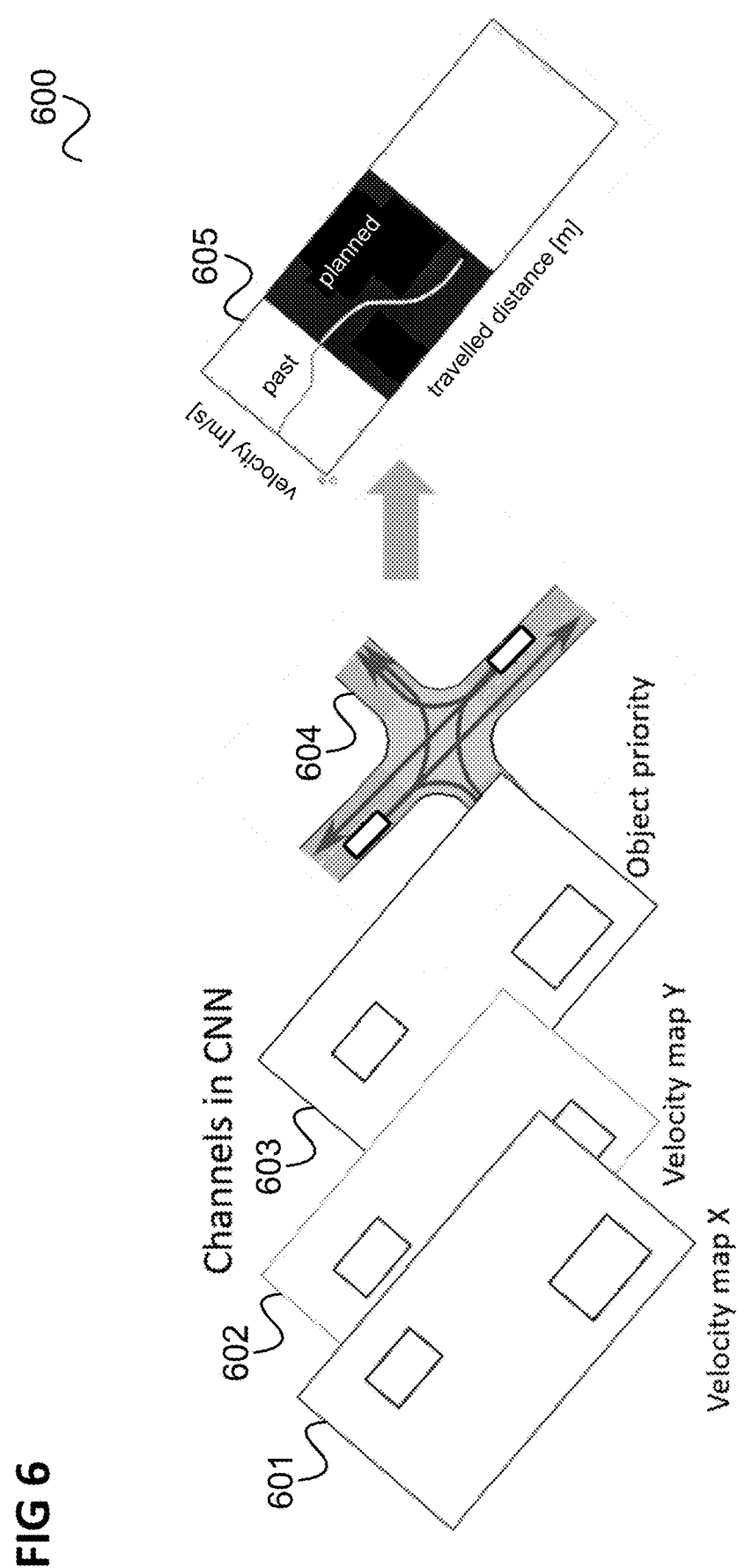
FIG. 6 illustrates the inputs and the output of a convolutional neural network for determining a target velocity profile for a vehicle.

FIG. 6 illustrates the inputs 601, 602, 603 and the output 604 of a convolutional neural network for determining a target velocity profile for a vehicle.

As described above, the output is an image showing a velocity profile in terms of a graph.

As input, the convolutional neural network receives an image representing, for the surroundings of the vehicle, a first velocity map 601 for velocities in a first direction (x direction). This means that for each pixel of the image, the first velocity map 601 specifies (by means of the pixel value for the pixel) the velocity in x-direction of an object located at the position in the surroundings of the vehicle to which the pixel corresponds. It should be noted that since an image (or map) corresponds to the surroundings of the vehicle (i.e. represents the geographical area around the vehicle), each pixel corresponds to a location and thus possibly to an object, namely the object located at the position of the surroundings of the vehicle to which the pixel corresponds (or which the pixel "shows"). The object may be a movable object but may also be immovable object. In the latter case, the velocity is zero. Also for non-moving areas like the street or the lawn the velocity is zero.

Similarly, the convolutional neural network receives an image representing, for the surroundings of the vehicle, a second velocity map 602 for velocities in a first direction (x direction).

Further, the convolutional neural network receives an image representing, for the surroundings of the vehicle, a priority map 603. This means that for each pixel of the image, the priority map 603 specifies (by means of the pixel value for the pixel) the priority of an object located at the position in the surroundings of the vehicle to which the pixel corresponds. The priority of an object may be the importance level at which a collision with the object should be avoided. This may for example be higher for a pedestrian than for a garbage box (and may be zero for areas where the vehicle can drive or is even supposed to drive (like available parts of the street). The object priority map may be used to differentiate the objects sizes, types and masses. A pedestrian may for example have highest probability. An object with high mass will cause more problems during a collision and therefore have higher cost function and may be assigned a higher priority to model this. The trucks with petrol or some dangerous materials will also have high cost functions and may be assigned a higher priority to model this.

Additionally, the convolutional neural network receives an image showing the location of objects and prototypical driving paths (e.g. as shown in FIG. 4B).

The vehicle controller 201 may generate the inputs based on sensor information like radar sensor data, LIDAR mono camera image data provided by the one or more sensors 204, for example using another neural network for environment modelling as described with reference to FIG. 3. Such sensor-based inputs may also be used for training the convolutional neural network.

Instead of giving the target velocity profile in form of a graph, the convolutional neural network may also be configured (e.g. by means of corresponding training) to give a risk as two dimensional function (i.e. as an image) where each pixel value specifies a risk depending on the driving distance and velocity. The vehicle controller 201 may then determine the target velocity profile using this function, e.g. by selecting the target velocity profile which minimizes the overall risk.

Figure 7:
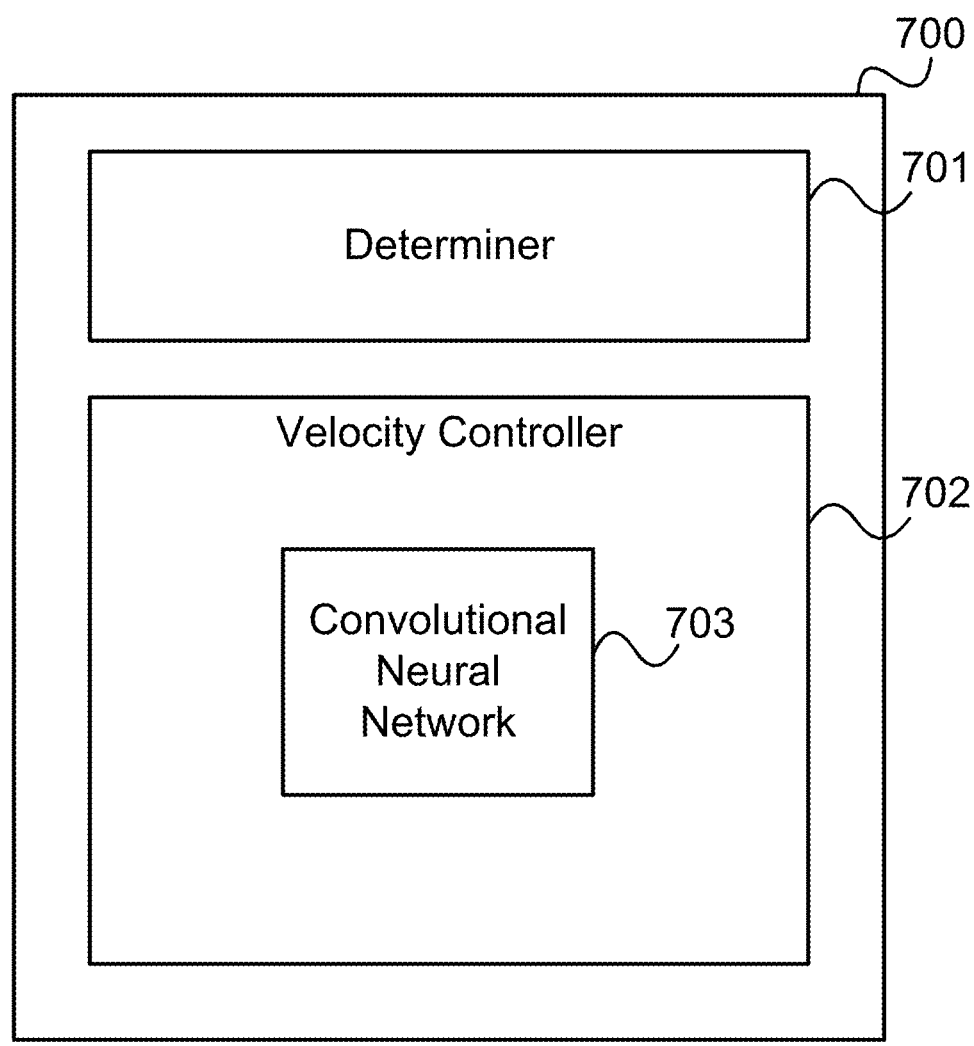
FIG. 7 shows a vehicle controller.

In summary, according to various embodiments, a vehicle controller is provided as illustrated in FIG. 7.

FIG. 7 shows a vehicle controller 700.

The vehicle controller 700 includes a determiner 701 configured to determine information about surroundings of a vehicle, the information about the surroundings including information about velocities of objects in the surroundings of the vehicle.

The vehicle controller 700 further includes a velocity controller 702 configured to input the information about the surroundings of the vehicle and a specification of a path of the vehicle to a convolutional neural network 703, to determine a target velocity of the vehicle along the path based on an output of the convolutional neural network 703 and to control the vehicle according to the determined target velocity.

According to various examples, in other words, a vehicle controller is configured to determine a target velocity (or a target velocity profile) along a path of a vehicle by means of a convolutional neural network. The convolutional neural network may be trained (or may have been trained) based on analytically generated labeled data, for example in such a way that it determines the target velocity (or the target velocity profile) to minimize risk along the path of the vehicle.

For training, i.e. for generating the training data, a driving risk function may be analytically derived, e.g. as described above. The driving risk function may include the risk of collision in several scenarios like parallel driving, turning in the crossing, etc. As the event cost function several sources may make contributions: vehicle-to-vehicle collisions, losing control because of heavy breaking and accident in curve because of very high velocity. The risk map (or risk function) which can be calculated analytically can be estimated with Deep Learning (e.g. by means of the convolutional neural network). An object velocity map, a map of the road matched to the ego vehicle location and an object priority map may be given as inputs to the Convolutional Neural Network (CNN) as different channels in the training. The priority map may represent object risk factors like size and weight. The deep learning output may be the risk function depending the driving path length and the velocity profile. The minimum of this risk function for the different driving distances gives the searched velocity profile.

Figure 8:
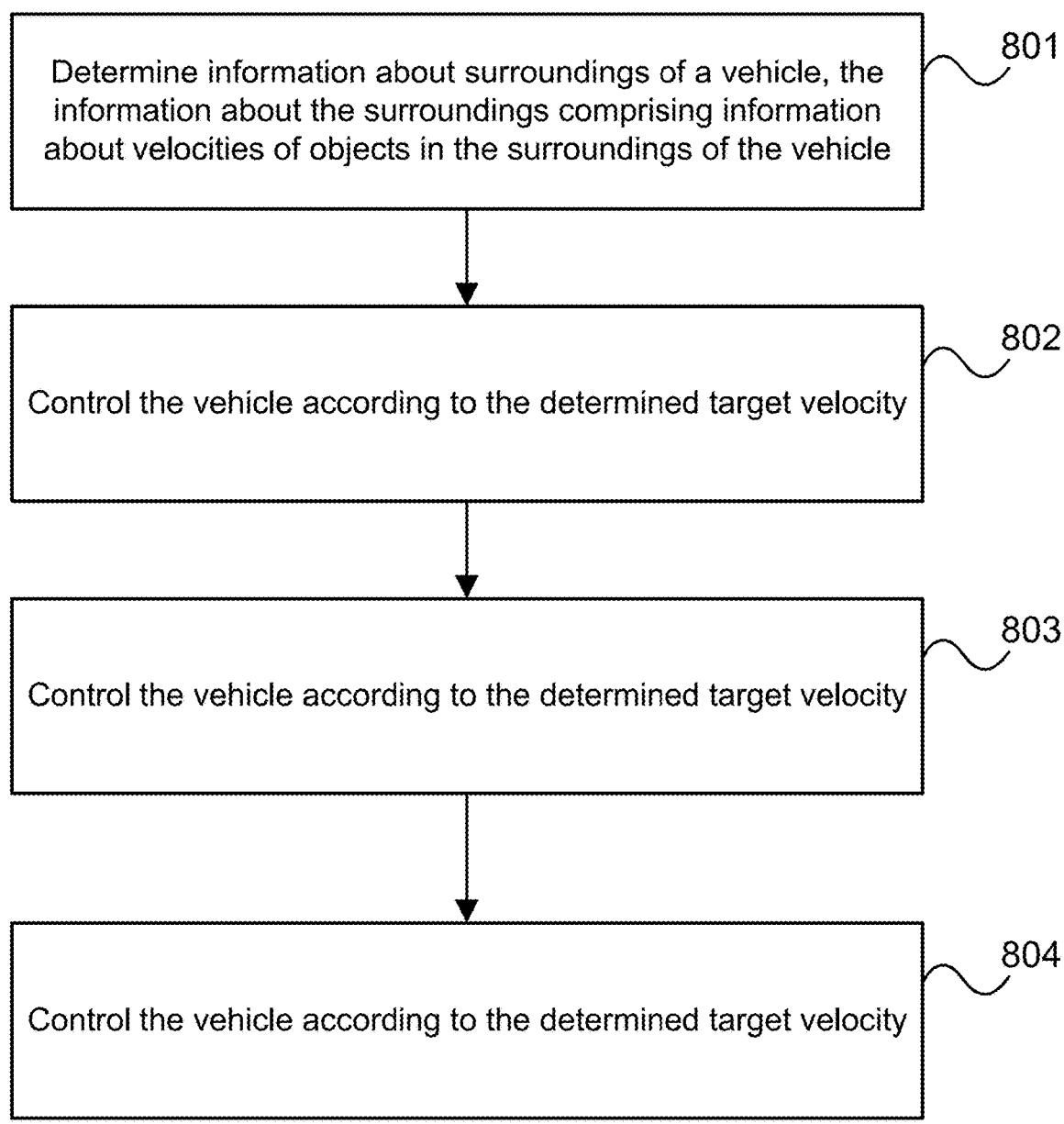
FIG. 8 shows a flow diagram illustrating a method for controlling a vehicle, for example performed by a vehicle controller.

According to various examples a method as illustrated in FIG. 8 is performed.

FIG. 8 shows a flow diagram 800 illustrating a method for controlling a vehicle, for example performed by a vehicle controller.

In 801, the vehicle controller determines information about surroundings of a vehicle, the information about the surroundings including information about velocities of objects in the surroundings of the vehicle.

In 802, the vehicle controller inputs the information about the surroundings of the vehicle and a specification of a path of the vehicle to a convolutional neural network.

In 803, the vehicle controller determines a target velocity of the vehicle along the path based on an output of the convolutional neural network.

In 804, the vehicle controller controls the vehicle according to the determined target velocity.

The control process as described with reference to FIG. 8 may be repeatedly performed, e.g. periodically, for example one or more times per second, e.g. once every 0.5 seconds.

The vehicle controller and its components (e.g. the velocity controller and the determiner) may for example be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor".

The following examples pertain to further exemplary implementations.

Example 1 is a vehicle controller as illustrated in FIG. 7.

In Example 2, the subject-matter of Example 1 may optionally include the information about the surroundings further including information about priorities of objects.

In Example 3, the subject-matter of Example 2 may optionally include a priority of an object specifying an importance level at which a collision with the object should be avoided.

In Example 4, the subject-matter of any one of Examples 1-3 may optionally include the determiner being configured to determine the information about the surroundings of the vehicle and the velocity controller being configured to input the information about the surroundings of the vehicle and a specification of a path of the vehicle to the convolutional neural network, to determine a target velocity of the vehicle along the path based on an output of the convolutional neural network and to control the vehicle according to the determined target velocity repeatedly.

In Example 5, the subject-matter of any one of Examples 1-4 may optionally include the information about the surroundings including information about the velocity of objects in the surroundings of the vehicle.

In Example 6, the subject-matter of any one of Examples 1-5 may optionally include an environment modeler configured to model an environment of the vehicle, wherein the determiner is configured to determine the information about the surroundings of the vehicle at least partially based on the modelled environment.

In Example 7, the subject-matter of Example 6 may optionally include the environment modeler modelling the environment by means of a further neural network.

In Example 8, the subject-matter of any one of Examples 1-7 may optionally include the velocity controller being configured to input the information about the surroundings of the vehicle and the specification of the path of the vehicle to the convolutional neural network in the form of one or more two-dimensional images.

In Example 9, the subject-matter of any one of Examples 1-8 may optionally include the output of the convolutional neural network specifying a target velocity for each of a plurality of positions along the path of the vehicle.

In Example 10, the subject-matter of any one of Examples 1-9 may optionally include the convolutional neural network being configured to output a specification of a target velocity for each of a plurality of positions along the path of the vehicle in form of a two-dimensional image.

In Example 11, the subject-matter of any one of Examples 1-10 may optionally include the convolutional neural network being configured to output a specification of a risk depending on velocity and travel distance along the path.

In Example 12, the subject-matter of any one of Examples 1-11 may optionally include the convolutional neural network being configured to output the specification of the risk depending on velocity and travel distance along the path in form of a two-dimensional image.

In Example 13, the subject-matter of any one of Examples 1-12 may optionally include a path controller configured to determine a target vehicle path and to control the vehicle according to the determined target vehicle path.

In Example 14, the subject-matter of any one of Examples 1-13 may optionally include the convolutional neural network being trained based on training data generated based on an analytical representation of a driving risk function.

Example 15 being a method for controlling a vehicle as illustrated in FIG. 8.

In Example 16, the subject-matter of Example 15 may optionally include the information about the surroundings further including information about priorities of objects.

In Example 17, the subject-matter of Example 16 may optionally include a priority of an object specifying an importance level at which a collision with the object should be avoided.

In Example 18, the subject-matter of any one of Examples 15-17 may optionally include determining the information about the surroundings of the vehicle and inputting the information about the surroundings of the vehicle and a specification of a path of the vehicle to the convolutional neural network, determining a target velocity of the vehicle along the path based on an output of the convolutional neural network and controlling the vehicle according to the determined target velocity repeatedly.

In Example 19, the subject-matter of any one of Examples 15-18 may optionally include the information about the surroundings including information about the velocity of objects in the surroundings of the vehicle.

In Example 20, the subject-matter of any one of Examples 15-19 may optionally include modelling an environment of the vehicle and determining the information about the surroundings of the vehicle at least partially based on the modelled environment.

In Example 21, the subject-matter of Example 20 may optionally include modelling the environment by means of a further neural network.

In Example 22, the subject-matter of any one of Examples 15-21 may optionally include inputting the information about the surroundings of the vehicle and the specification of the path of the vehicle to the convolutional neural network in the form of one or more two-dimensional images.

In Example 23, the subject-matter of any one of Examples 15-22 may optionally include the output of the convolutional neural network specifying a target velocity for each of a plurality of positions along the path of the vehicle.

In Example 24, the subject-matter of any one of Examples 15-23 may optionally include the convolutional neural network outputting a specification of a target velocity for each of a plurality of positions along the path of the vehicle in form of a two-dimensional image.

In Example 25, the subject-matter of any one of Examples 15-24 may optionally include the convolutional neural network outputting a specification of a risk depending on velocity and travel distance along the path.

In Example 26, the subject-matter of any one of Examples 15-25 may optionally include the convolutional neural network outputting the specification of the risk depending on velocity and travel distance along the path in form of a two-dimensional image.

In Example 27, the subject-matter of any one of Examples 15-26 may optionally include determining a target vehicle path and controlling the vehicle according to the determined target vehicle path.

In Example 28, the subject-matter of any one of Examples 15-27 may optionally include training the convolutional neural network based on training data generated based on an analytical representation of a driving risk function.

According to a further example, a vehicle controller (and a corresponding method for controlling a vehicle) are provided wherein the vehicle controller includes (e.g. implements) a convolutional neural network, trained to derive a velocity profile or a risk profile for a path of a vehicle (i.e. a velocity or risk for positions on the vehicle path) from information about surroundings of the vehicle. The vehicle controller is configured to control the vehicle based on be velocity or risk profile.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A vehicle controller comprising:
a determiner configured to determine information about surroundings of a vehicle, the information about the surroundings comprising information about velocities of objects in the surroundings of the vehicle; and
a velocity controller configured
to input the information about the surroundings of the vehicle and a specification of a path of the vehicle to a convolutional neural network,
to determine a target velocity of the vehicle along the path based on an output of the convolutional neural network and
to control the vehicle according to the determined target velocity;
wherein the information about the surroundings further comprises information about priorities of objects and wherein a priority of an object specifies an importance level at which a collision with the object should be avoided.

2. The vehicle controller of claim 1, wherein the determiner is configured to determine the information about the surroundings of the vehicle and the velocity controller is configured to input the information about the surroundings of the vehicle and a specification of a path of the vehicle to the convolutional neural network, to determine a target velocity of the vehicle along the path based on an output of the convolutional neural network and to control the vehicle according to the determined target velocity repeatedly.

3. The vehicle controller of claim 1, wherein the information about the surroundings includes information about the velocity of objects in the surroundings of the vehicle.

4. The vehicle controller of claim 1, further comprising an environment modeler configured to model an environment of the vehicle, wherein the determiner is configured to determine the information about the surroundings of the vehicle at least partially based on the modelled environment.

5. The vehicle controller of claim 4, wherein the environment modeler models the environment by means of a further neural network.

6. The vehicle controller of claim 1, wherein the velocity controller is configured to input the information about the surroundings of the vehicle and the specification of the path of the vehicle to the convolutional neural network in the form of one or more two-dimensional images.

7. The vehicle controller of claim 1, wherein the output of the convolutional neural network specifies a target velocity for each of a plurality of positions along the path of the vehicle.

8. The vehicle controller of claim 1, wherein the convolutional neural network is configured to output a specification of a target velocity for each of a plurality of positions along the path of the vehicle in form of a two-dimensional image.

9. The vehicle controller of claim 1, wherein the convolutional neural network is configured to output a specification of a risk depending on velocity and travel distance along the path.

10. The vehicle controller of claim 9, wherein the specification of risk comprises a probability of an occurrence happening multiplied by a resulting cost or benefit of the occurrence happening.

11. The vehicle controller of claim 1, wherein the convolutional neural network is configured to output the specification of the risk depending on velocity and travel distance along the path in form of a two-dimensional image.

12. The vehicle controller of claim 1, further comprising a path controller configured to determine a target vehicle path and to control the vehicle according to the determined target vehicle path.

13. The vehicle controller of claim 1, wherein the convolutional neural network is trained based on training data generated based on an analytical representation of a driving risk function.

14. A method for controlling a vehicle comprising:
   determining information about surroundings of a vehicle, the information about the surroundings comprising information about velocities of objects in the surroundings of the vehicle,
   inputting the information about the surroundings of the vehicle and a specification of a path of the vehicle to a convolutional neural network,
   determining a target velocity of the vehicle along the path based on an output of the convolutional neural network and
   controlling the vehicle according to the determined target velocity;
   wherein the information about the surroundings further comprises information about priorities of objects and wherein a priority of an object specifies an importance level at which a collision with the object should be avoided.

15. The method of claim 14, comprising determining the information about the surroundings of the vehicle and inputting the information about the surroundings of the vehicle and a specification of a path of the vehicle to the convolutional neural network, determining a target velocity of the vehicle along the path based on an output of the convolutional neural network and controlling the vehicle according to the determined target velocity repeatedly.

16. The method of claim 14, wherein the information about the surroundings includes information about the velocity of objects in the surroundings of the vehicle.

17. The method of claim 14, further comprising modelling an environment of the vehicle and determining the information about the surroundings of the vehicle at least partially based on the modelled environment.

18. A vehicle controller comprising:
   a determiner configured to determine information about surroundings of a vehicle, the information about the surroundings comprising information about velocities of objects in the surroundings of the vehicle; and
   a velocity controller configured
   to input the information about the surroundings of the vehicle and a specification of a path of the vehicle to a convolutional neural network,
   to determine a target velocity of the vehicle along the path based on an output of the convolutional neural network and
   to control the vehicle according to the determined target velocity;
   wherein the environment modeler models the environment by means of a further neural network.

* * * * *